(12) United States Patent
Takabayashi

(10) Patent No.: US 6,966,645 B2
(45) Date of Patent: Nov. 22, 2005

(54) CONSERVATION METHOD OF INK FOR INK-JET RECORDING AND IMAGE FORMING METHOD

(75) Inventor: Toshiyuki Takabayashi, Hachioji (JP)

(73) Assignee: Konica Corporation, Tokyo (JP)

(*) Notice: Subject to any disclaimer, the term of this patent is extended or adjusted under 35 U.S.C. 154(b) by 54 days.

(21) Appl. No.: 10/621,635

(22) Filed: Jul. 17, 2003

(65) Prior Publication Data
US 2004/0017451 A1 Jan. 29, 2004

(30) Foreign Application Priority Data
Jul. 24, 2002 (JP) ......... 2002-215164

(51) Int. Cl.⁷ ............. B41J 2/01
(52) U.S. Cl. ......... 347/100; 347/86; 347/101; 347/102
(58) Field of Search ......... 347/100, 101, 347/95, 96, 102, 86, 85; 106/31.6, 31.27, 31.13; 523/160

(56) References Cited

U.S. PATENT DOCUMENTS

| | | | | |
|---|---|---|---|---|
| 5,721,020 A | * | 2/1998 | Takami et al. | 427/508 |
| 6,232,361 B1 | * | 5/2001 | Laksin et al. | 523/160 |
| 6,471,318 B2 | * | 10/2002 | Fujii | 347/9 |
| 6,528,127 B1 | * | 3/2003 | Edlein et al. | 427/494 |
| 6,846,074 B2 | * | 1/2005 | Hirai | 347/102 |
| 2003/0199612 A1 | * | 10/2003 | Nakajima | 523/160 |

FOREIGN PATENT DOCUMENTS

| | | | | |
|---|---|---|---|---|
| EP | 71345 A2 | * | 2/1983 | C09D/11/00 |
| WO | WO 01/48102 A1 | * | 7/2001 | C09D/11/02 |

* cited by examiner

Primary Examiner—Manish S. Shah
(74) Attorney, Agent, or Firm—Lucas and Mercanti

(57) ABSTRACT

A method for preserving an ink-jet, including a step of: keeping the ink-jet ink in a sealed container having a ratio of water of 1.50 to 5.00 weight % measured with Karl-Fischer method in an inside portion of the sealed container, wherein the ink-jet ink includes a cationic polymerizable monomer and an initiator, and the ink-jet ink is curable by irradiation with an active energy ray.

13 Claims, 3 Drawing Sheets

CONSERVATION METHOD OF INK FOR INK-JET RECORDING AND IMAGE FORMING METHOD

TECHNICAL FIELD

The present invention relates to a conservation method of an ink for ink-jet recording by which a high minute image can be stably reproduced on various recording materials, and also the present invention relates to an image forming method using thereof.

BACKGROUND

Recently, the ink-jet recording has been applied to recording has been applied to various printing fields such as photography, various kinds of printings, and especially printing such as marking and color filters because the ink-jet recording method can produce an image simply and at low cost.

Particularly, an image quality almost equal to a silver halide photograph can be obtained by means of: (i) a recording apparatus which enables to jet and to control a fine dot; (ii) an ink having improved properties of color reproduction area, durability, and jetting property; and (iii) an exclusive use sheet in which the absorptivity of the ink, coloring property of the coloring material, surface glossiness are greatly increased.

The increase of the image quality of today's ink-jet recording system is attained only when all of the recording apparatus, ink, and exclusive use sheet are present.

However, for the ink-jet system which requires exclusive use sheets, the kinds of the recording medium are limited and the cost increase of the recording medium becomes a problem. Accordingly, many trials have been made to record onto the recording medium different from the exclusive use sheet using the ink-jet method. They are, for example, a phase change ink-jet system using a solid wax ink at a room temperature, a solvent type ink-jet system using a quick dry type organic solvent as a main component, or a UV ink-jet system in which a cross-linkage is formed by an ultra violet (UV) ray after recording.

Among the above-mentioned trials, the UV ink-jet system has a lower degree of smell than the solvent type ink-jet system. The UV ink-jet system has been paid attention in recent years by considering its rapid drying property and a capability to record on a non-ink absorptive medium. Listed examples are shown, in Japanese Patent Publication Open to Public Inspection (hereafter is called, JP-A) No. 5-54667, JP-A No. 6-200204, and Japanese Translated PCT Patent Publication No. 2000-504778, the ultraviolet ray curing type ink-jet ink is disclosed.

However, even when these inks are used, it is difficult to form the highly minute image onto various recording materials because a diameter of a dot reached on the recording material is largely changed due to the kind of the recording material or the working environment.

For example, as the ultraviolet ray curing type ink, there are a radical polymerization type ultraviolet ray curing type ink comprising an acrylic component as a main composition, and a cation polymerization type ultraviolet ray curing type ink. The radical polymerization type ultraviolet ray curing type ink has a problem in which, in its polymerization mechanism, the curing property is decreased because it is subjected to the oxygen inhibition action under the environment in which the oxygen is present. On the one hand, the cation polymerization type ultraviolet ray curing type ink is not subjected to the oxygen inhibition action. However, due to the nature of the polymerization reaction, there is a problem in which it is easily subjected to the influence of water, and the dark reaction is easily advanced, resulting a problem of low shelf keeping stability.

SUMMARY

In view of the above-described problems, the present invention is attained, and the object of the present invention is to provide a conservation method of the ink for the active ray (or called active energy ray) curing type ink-jet recording and an image forming method in which the character quality is excellent, color mixing is not generated, and by which a high minute image can be highly stably recorded.

The above-described objects of the present invention are attained by the following structures.

(1) A conservation method of the ink for ink-jet recording which is characterized in that: the ink is an ink for active ray curing type ink-jet recording including a cation polymerization monomer and an initiator, and it is sealed in a container under the condition that the measured percentage of water content by Karl-Fischer method is 1.50–5.00 weight %.

(2) A conservation method of the ink for the ink-jet recording according to (1), wherein the ink includes at least one kind of oxetane compound as the cation polymerization monomer.

(3) A conservation method of the ink for the ink-jet recording according to (1) or (2), wherein the ink includes a compound having at least one kind of oxirane group.

(4) In an image forming method by which the printing is conducted onto the recording material by jetting the active ray curing type ink conserved by the conservation method of the ink for ink-jet recording according to any one of (1)–(3) by the ink-jet recording head, the image forming method is characterized in that: after the ink impacts, the active ray is irradiated during 0.001–2.0 seconds.

(5) In an image forming method by which the printing is conducted onto the recording material by jetting the active ray curing type ink conserved by the conservation method of the ink for ink-jet recording according to any one of (1)–(3) by the ink-jet recording head, the image forming method is characterized in that: the total ink film thickness after the ink impacts and is cured by the irradiation of the active ray is 2–20 $\mu$m.

(6) In an image forming method by which the printing is conducted onto the recording material by jetting the active ray curing type ink conserved by the conservation method of the ink for ink-jet recording according to any one of (1)–(3) by the ink-jet recording head, the image forming method is characterized in that: the ink liquid drop amount jetted from each nozzle of the recording heads is 2–15 pl (pico liter).

(7) In an image forming method by which the printing is conducted onto the recording material by jetting the active ray curing type ink conserved by the conservation method of the ink for ink-jet recording according to any one of (1)–(3) by the ink-jet recording head, the image forming method is characterized in that: the recording head and the ink are controlled to be between 35 and 100° C., and the ink is jetted.

(8) In an image forming method by which the printing is conducted onto the recording material by jetting the active ray curing type ink conserved by the conservation method of the ink for ink-jet recording according to any one of (1)–(3) by the ink-jet recording head, the image forming method is characterized in that: the active ray is irradiated on the ink which impacts on the recording material, and the ink which impacts on the recording material is heated.

(9) An image forming method according to any one of (4)–(8), wherein the recording material is non-absorptive material.

(10) An image forming method according to (9), wherein the surface energy of the non-absorptive material is $3.5-6.0 \times 10^{-2}$ $Nm^{-1}$.

DESCRIPTION OF PREFERRED EMBODIMENTS

Figure 1:
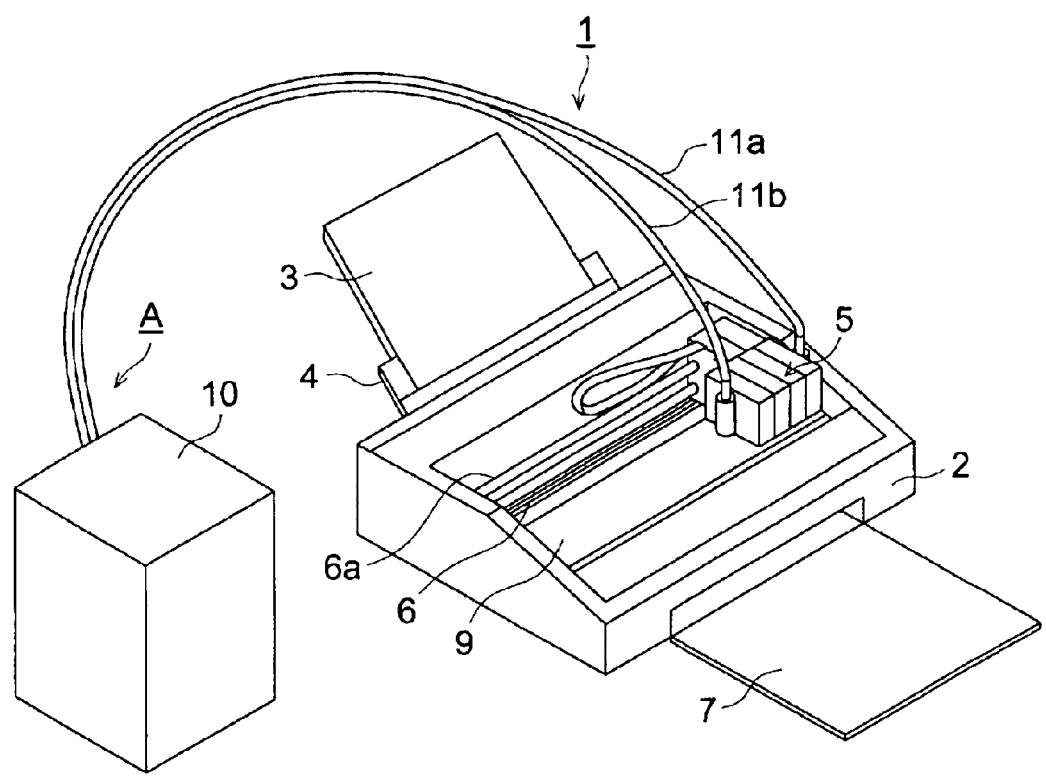
FIG. 1 is a perspective view of the whole of an ink-jet printer having a heating means which can be used in the present invention.

The present invention will be detailed below. The active ray curing type ink for ink-jet recording used in the present invention is sealed in the container under the condition that the measured percentage of water content by the Karl-Fischer method is 1.50–5.00 weight % and conserved. For example, when the ink is sealed in the container under the high humidity of 20° C., 80% RH, the percentage of water content within the above range can be attained, however, it is not limited to this. When it is lower than 1.50 weight %, the dispersion of the ink viscosity becomes large by the conservation, and the jetting from the recording head is not stable. Particularly, when the ink liquid drop amount is small, the condition is severe. When it is higher than 5.00 weight %, the curing ability becomes very poor. Particularly, for the increase of the image quality, when it is desired to cur the ink just after the ink impacts on the recording material, the condition becomes severe.

When the active ray curing type ink, which comprises a cation polymerization monomer and an initiator, and being conserved within the range of the above percentage of water content, is used, a high minute image can be stably formed without being influenced by the conservation environment (temperature and humidity) of the ink and the printing environment (temperature and humidity). Further, it is preferable to seal hermetically an ink supplying path from an ink container to a recording head to achieve effectively the effect of the present invention.

Further, as the cation polymerization monomer, when the oxetane compound is included, the control of the percentage of the water content at the time of the ink conservation is particularly effective. When the oxetane compound and the compound having the oxirane group are jointly used together, it is more effective.

As an initiator, for example, the compound used for the chemical amplification type photo resist or optical cation polymerization is used ("Organic material for imaging" edited by the organic electronics material study group, Bunshin publication co. (1993), refer to pages 187–192, photo acid generators introduced in "Photo-curing engineering" 2001, by the engineering information association).

Examples of the compounds adequate for the present invention will be listed below. Firstly, $B(C_6F_5)_4-$, $PF_6-$, $AsF_6-$, $SbF_6-$, $CF_3SO_3-$ salt of the aromatic onium compound such as diazonium, ammonium, iodonium, sulfonium, can be listed. As anti-anion, a compound having a borate compound is preferable because the acid generating ability is high. Specific examples of the onium compounds will be shown below.

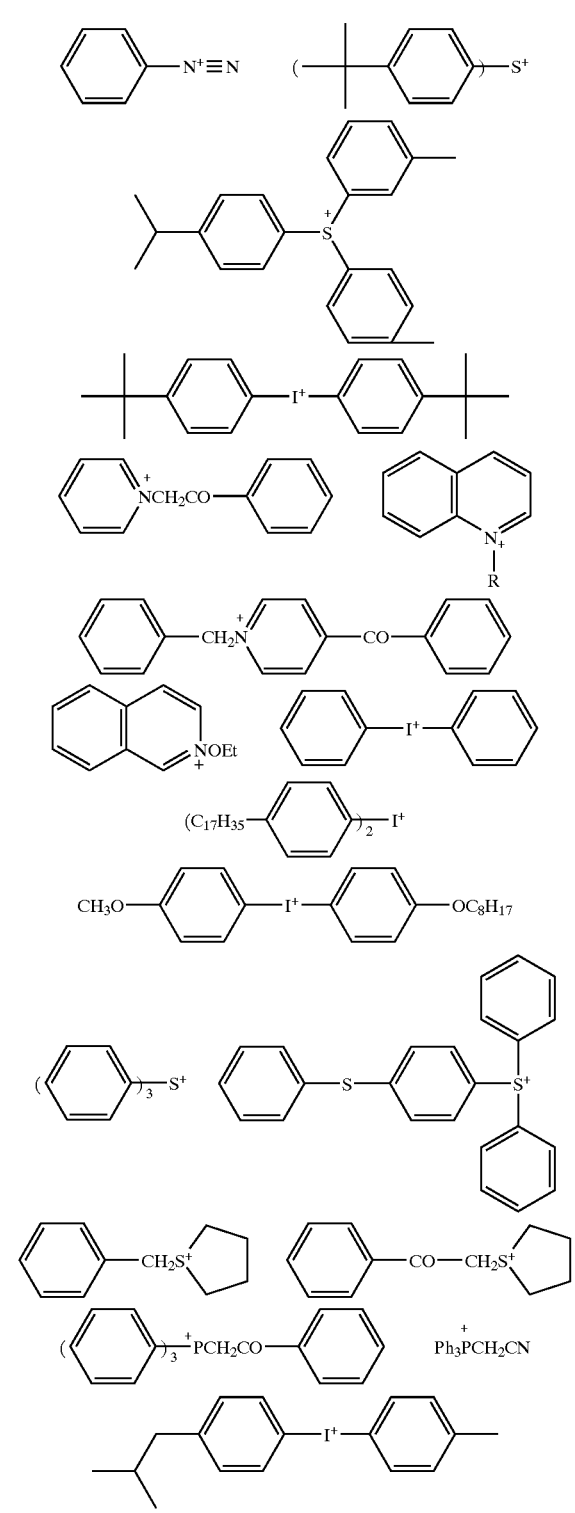

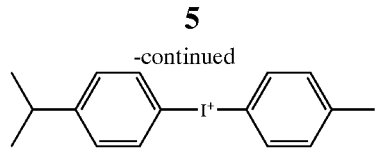

Secondly, the sulfonation compound generating the sulfonic acid can be listed. Specific compounds will be illustrated below.

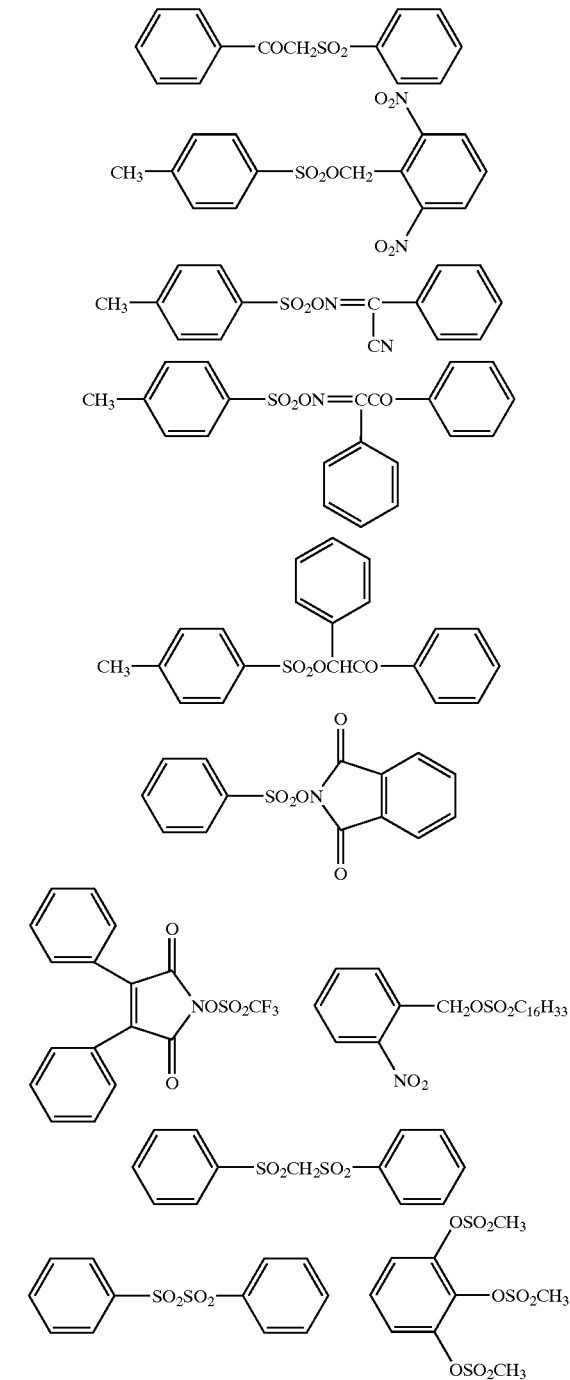

Thirdly, a halide compound which generates a hydrogen halide by irradiation of light may also be used. Specific compounds will be illustrated below.

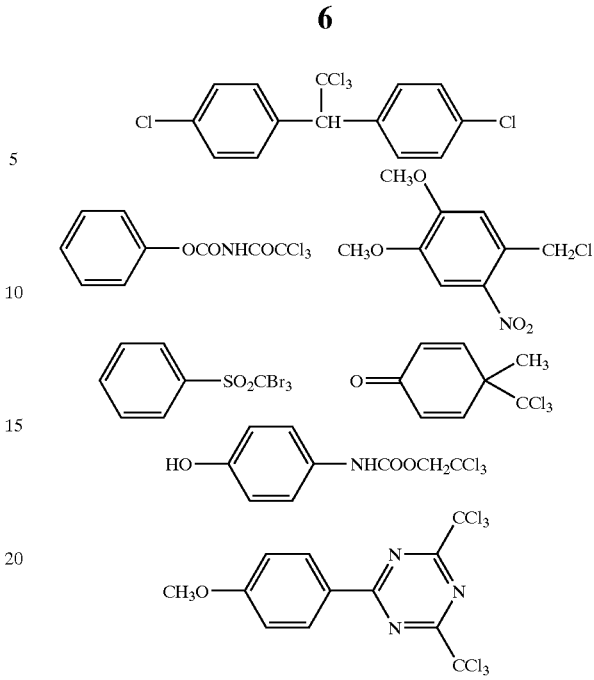

Fourthly, iron-arene complex can be listed.

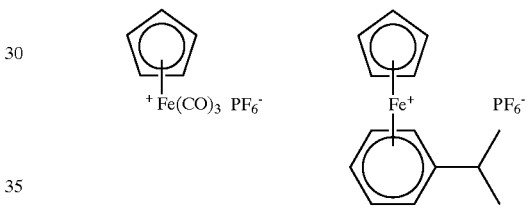

It is preferable that the ink of the present invention includes the acid breeding agent which newly generates the acid by the acid generated by the irradiation of the active ray which is well known already including JP-A No. 8-248561, and JP-A No. 9-34106. By using the acid breeding agent, a more increase of the jetting stability can be attained.

Next, an oxetane compound used for the ink of the present invention will be described. The oxetane compound is a compound having an oxetane ring, and for example, well known all oxetane compounds as introduced in JP-A No. 2001-220526, and JP-A No. 2001-310937, can be used.

When the compound having oxetane rings not smaller than 5 is used, because the viscosity of the composition becomes high, the handling is difficult, and because the glass transferring temperature of the composition increases, the stickiness of the obtained cured material becomes insufficient. It is preferable that the compound having the oxetane rings used in the present invention is a compound having 1–4 oxetane rings.

As compounds having one oxetane ring, compounds shown by the General Formula (1) are listed.

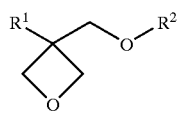

In the expression (1), $R^1$ is hydrogen atom or alkyl group of number of carbons of 1–6, such as methyl group, ethyl group, propyl group, or butyl group, fluoro alkyl group of number of carbons of 1–6, allyl group, aryl group, furyl group or thienyl group. $R^2$ is alkyl group of number of carbons 1–6 such as methyl group, ethyl group, propyl group, or butyl group, alchenyl group of number of carbons 2–6 such as 1-propenyl group, 2-propenyl group, 2-methyl-1 propenyl group, 2-methyl-2-propenyl group, 1-buthenyl group, 2-buthenyl group, or 3 buthenyl group, a group having the aromatic ring such as phenyl group, benzyl group, fluoro benzyl group, methoxy benzyl group, or phenoxy ethyl group, alkyl carbonyl group of number of carbons 2–6, such as ethyl carbonyl group, propyl carbonyl group, or butyl carbonyl group, alcoxy carbonyl group of number of carbons 2–6, such as ethoxy carbonyl group, propoxy carbonyl group, or buthoxy carbonyl group, or N-alkyl carbamoyl group of number of carbons 2–6, such as ethyl carbamoyl group, propyl carbamoyl group, butyl carbamoyl group or pentyl carbamoyl group.

As the oxetane compound used in the present invention, it is particularly preferable that the compound having one oxetane ring is used, because the obtained composition is excellent in the stickiness and it is excellent in the operability in the low viscosity. Next, as the compound having 2 oxetane rings, compounds shown by the following General Formula (2) are listed.

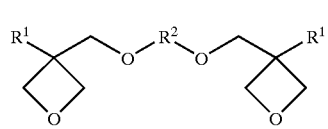

General Formula (2)

In the General Formula (2), $R^1$ is the same group as $R^1$ in the General Formula (1). $R^3$ is, for example, a linear or branched chain alkyrene group such as ethylene group, propylene group or butylene group, linear or branched chain poly (alkylene oxy) group, such as poly (ethylene oxy) group or poly (propylene oxy)group, linear or branched chain unsaturated hydrocarbon group, such as propenylene group, methyl propenylene group or butenylen group, or carbonyl group, or alkylene group including carbonyl group, alkylene group including carboxyl group, or alkylene group including carbamoyl group.

Further, $R^3$ is also a polyvalent group selected from the groups shown by the following General Formulas (3), (4), and (5).

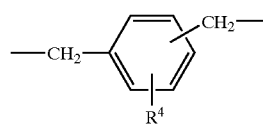

General Formula (3)

In the General Formula (3), $R^4$ is hydrogen atom, or alkyl group of number of carbons 1–4 such as methyl group, ethyl group, propyl group, butyl group, alkoxy group of number of carbons of 1–4 such as methoxy group, ethoxy group, propoxy group, or butoxy group, halogen atom such as chlorine atom, or bromine atom, nitro group, cyano group, mercapto group, lower alkoxy carboxyl group, carboxyl group, or carbamoyl group.

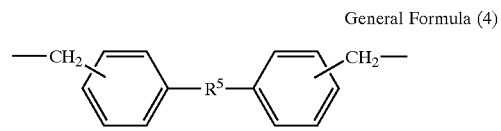

General Formula (4)

In the General Formula (4), $R^5$ expresses oxygen atom, sulfur atom, methylene group, NH, SO, $SO_2$, $C(CF_3)_2$, or $C(CH_3)_2$.

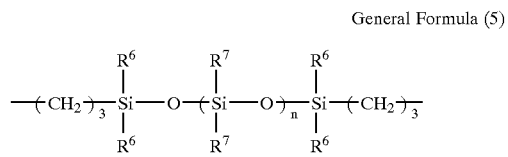

General Formula (5)

In General Formula (5), $R^6$ is alkyl group of number of carbons 1–4, such as methyl group, ethyl group, propyl group, or butyl group, or aryl group. Numeral n is an integer of 0–2000. $R^7$ is alkyl group of number of carbons 1–4, such as methyl group, ethyl group, propyl group, butyl group, or aryl group. $R^7$ is also a group selected from groups shown by the following General Formula (6).

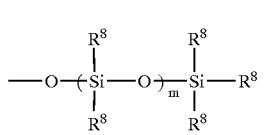

General Formula (6)

In the General Formula (6), $R^8$ is alkyl group of number of carbons 1–4 such as methyl group, ethyl group, propyl group, and butyl group, or aryl group. Numeral m is an integer of 0–100. As specific examples of the compound having 2 oxetane rings, the following compounds are listed.

EXAMPLE COMPOUND 1

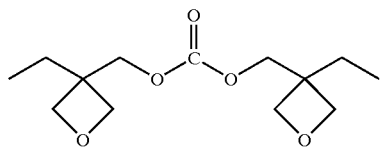

EXAMPLE COMPOUND 2

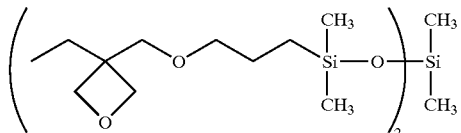

Example compound 1 is, in the General Formula (2), a compound in which $R^1$ is ethyl group, and $R^3$ is carboxyl group. Further, the Example compound 2 is, in the General Formula (2), a compound in which $R^1$ is ethyl group, and $R^3$ is a compound in which $R^6$ and $R^7$ are, in the General Formula (5), methyl groups, and numeral n is 1. In the compound having 2 oxetane rings, as the preferable example except the above-described compounds, there are compounds shown in the following General Formula (7). In the General Formula (7), $R^1$ is the same group as the $R^1$ in the General Formula (1).

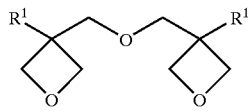

General Formula (7)

As examples of the compound having 3–4 oxetane rings, the compounds shown by the following General Formula (8) are listed.

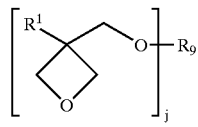

General Formula (8)

In the General Formula (8), $R^1$ is the same group as $R^1$ in the General Formula (1). As $R^9$, for example, a branched chain alkylene group of number of carbons 1–12 such as groups shown by the following A–C, branched chain poly (alkylene oxy) group such as group shown by the following D, or branched chain poly siloxy group such as group shown by the following E, are listed. Numeral j is 3 or 4.

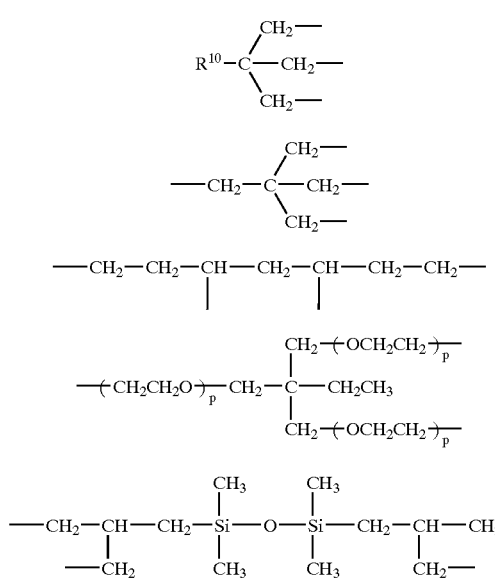

In above A, $R^{10}$ is the lower alkyl group such as methyl group, ethyl group, or propyl group. Further, in above D, p is 1–10.

As a specific example of compound having 3–4 oxetane rings, Example compound 3 is listed.

EXAMPLE COMPOUND 3

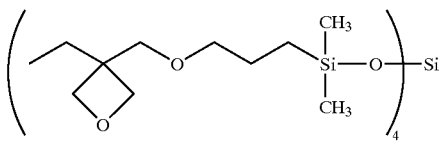

Further, as examples of compound having 1–4 oxetane rings except the above-described one, the compounds shown by the following General Formula (9) are listed.

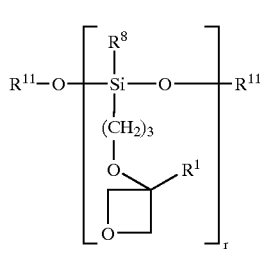

General Formula (9)

In the General Formula (9), $R^8$ is the same group as $R^8$ of the General Formula (6). $R^{11}$ is alkyl group of number of carbons 1–4 such as methyl group, ethyl group, propyl group or butyl group, or tri-alkyl silyl group, and r is 1–4. As preferable specific examples of the oxetane compounds used in the present invention, there are Example compounds 4–6 shown below.

EXAMPLE COMPOUND 4

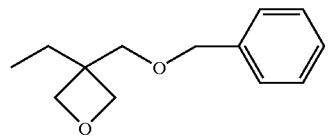

EXAMPLE COMPOUND 5

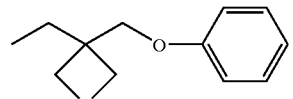

EXAMPLE COMPOUND 6

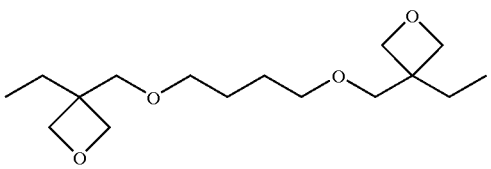

The production method of the compound having the above-described oxetane ring is not particularly limited, and may follow the conventionally known method, for example, there is the oxetane ring synthesizing method from diol, which is disclosed by Pattison (D. B. Pattison, J. Am. Chem. Soc., 3455, 79 (1957)). Further, other than this, compounds having 1–4 oxetane rings having the high molecular weight of about 1000–5000 are also listed. As examples of these compounds, for example, the following compounds are listed.

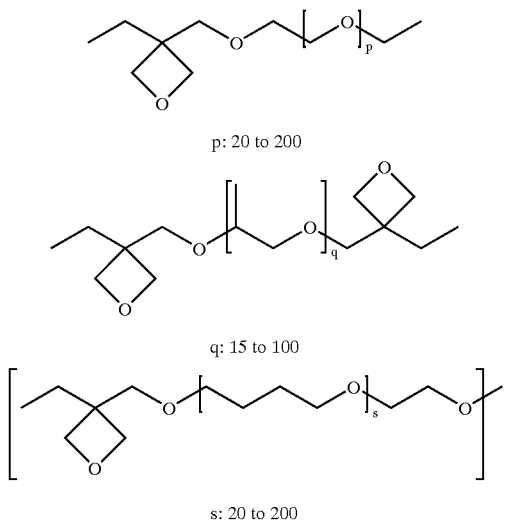

p: 20 to 200 q: 15 to 100 s: 20 to 200

In epoxy compounds including oxirane group, the preferable one as aromatic epoxide is polyhydric phenol having at least one aromatic nucleus or di or poly glycidyl ether which is produced by the reaction of its alkylene oxide additive body and epichloro-hydrin, and for example, bisphenol A or di or poly glycidyl ether of its alkylene oxide additive body, and novolak type epoxy resin are listed. Herein, as the alkylene oxide, ethylene oxide and propylene oxide are listed.

As the alicyclic epoxide, compounds including cyclohexene oxide or cyclopentene oxide obtained when compounds having at least one cyclo alkane ring such as cyclo hexene or cyclo pentene ring are epoxided by the adequate oxidation agent such as hydrogen peroxide or peroxy acid are preferable.

As a preferable one of aliphatic epoxide, there are aliphatic polyhydric alcohol or di or poly glycidyl ether of its alkylene oxide additive body, and as its representative example, di-glycidyl ether of ethylene glycol, di-glycidyl ether of propyrene glycol, or di-glycidyl ether of alkyrene glycol such as di-glycidyl ether of 1, 6 hexane diol, poly-glycidyl ether of polyhydroric alcohol such as di or tri-glycidyl ether of glycerin or its alkylene oxide additive body, di-glycidyl ether of poly-alkyrene glycol such as di-glycidyl ether of polyethylene glycol or its alkylene oxide additive body, di-glycidyl ether of poly-alkyrene glycol such as di-glycidyl ether of polypropylene glycol or its alkylene oxide additive body, are listed. Herein, as the alkylene oxide, ethylene oxide and propylene oxide are listed.

In the image forming method of the present invention, when the ink is jetted on the recording material by the ink-jet recording method and the image is drawn, and next the active ray such as ultraviolet ray is irradiated, the ink is cured and the image is formed.

As the jetting condition of the ink, it is preferable for the point of the jetting stability that the recording head and the ink are heated at 35–100° C., and the ink is jetted. Because the active ray curing type ink has a large viscosity variation range due to the temperature variation, and the variation of the viscosity largely influences the liquid drop size and the liquid drop jetting speed as it is, and the image quality deterioration is caused, it is necessary that its temperature is kept constant while the ink temperature is risen. As the control width of the ink temperature, it is a setting temperature ±5° C., preferably, the setting temperature ±2° C., and further preferably the setting temperature ±1° C.

In the present invention, it is preferable that the total ink film thickness after the ink impacts, and active ray is irradiated and the ink is cured, is 2–20 μm. Herein, "total film thickness" means the maximum value of the film thickness of the ink drawn on the recording material, and it means the same even for the mono color, and even when the recording is conducted by the ink-jet recording method such as 2 colors superimposition except that (secondary color), 3-color superimposition (third order color), 4-color super-imposition (such as the white ink base). In the active ray curing type ink-jet recording of the screen printing field, the actual situation is that the total ink film thickness exceeds 20 μm, however, in the soft package printing field in which the case where the recording material is thin plastic material is many, because, not only a problem of the curl and wrinkle, there is a problem in which the stiffness and texture of the whole printed matter are changed, it can not be used.

Further, in the present invention, it is preferable that the liquid drop amount jetted from each nozzle is 2–15 pl. In order to form the high minute image, it is necessary that the liquid drop amount is within this range, however, in the case where the ink is jetted with this liquid drop amount, the jetting stability becomes particularly severe as described above.

In the image recording method in the present invention, as the irradiation condition of the generation ray, it is preferable that the active ray is irradiated during the time period of 0.001–2.0 sec after the ink impacts, and more preferably, 0.001–1.0 sec. In order to form the high minute image, it is particularly important that the irradiation timing is as faster as possible.

As an irradiation method of the active ray, its basic method is disclosed in JP-A No. 60-132767. According to this, the light sources are provided on both sides of the head unit, and the head and the light source are scanned by the shuttle method. The irradiation is conducted after a constant time period after the ink impacts. Further, the curing is completed by another light source which is not accompanied by driving. In U.S. Pat. No. 6,145,979, as the irradiation method, the method using the optical fiber or the method by which the collimated light source is hit on the mirror surface provided on the head unit side surface and the UV light is irradiated onto the recording section, is disclosed. In the image forming method of the present invention, any one of these irradiation methods can be used.

Further, the irradiation of the active ray is divided into 2 stages, and a method by which, initially, the active ray is irradiated for 0.001–2.0 sec after the ink impacts by the above-described method, and after all printings are completed, the active ray is further irradiated, is also one of preferable modes. When the irradiation of the active ray is divided into 2 stages, the shrinkage of the recording material caused at the time of the ink curing can be further suppressed.

In the image forming method of the present invention, it is preferable for forming the high minute image that the ink composition is jetted on the recording material and drawn by the ink-jet recording method, and next, the active ray such as ultra violet ray is irradiated, and the ink is heated, and cured.

Next, an example of the ink-jet recording apparatus according to the present invention will be specifically described.

Figure 2:
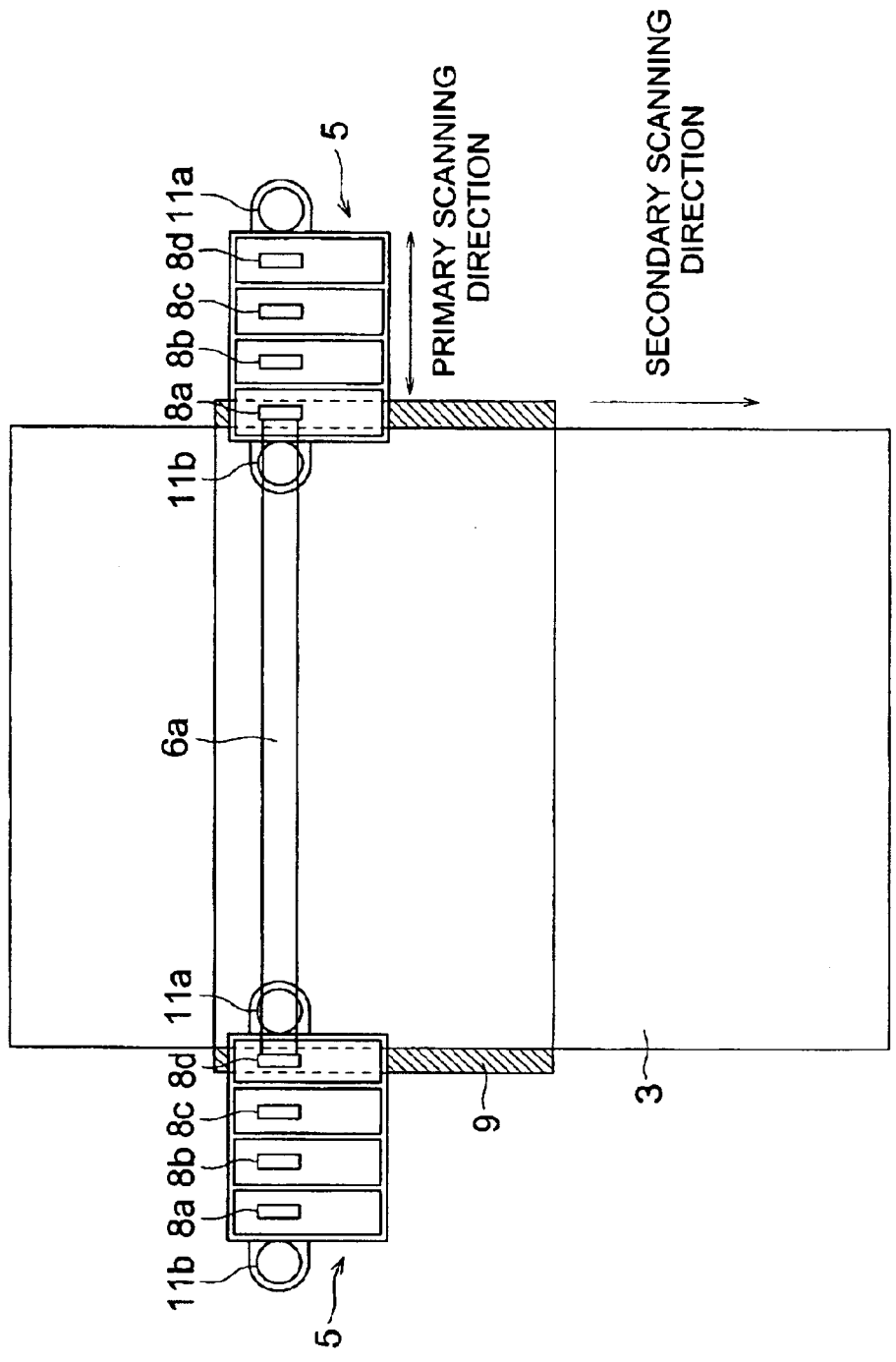
FIG. 2 is an outline plan view showing the positional relationship between an ink-jet recording head and the leading edge of an optical fiber and the positional relationship with a heat plate.
Figure 3:
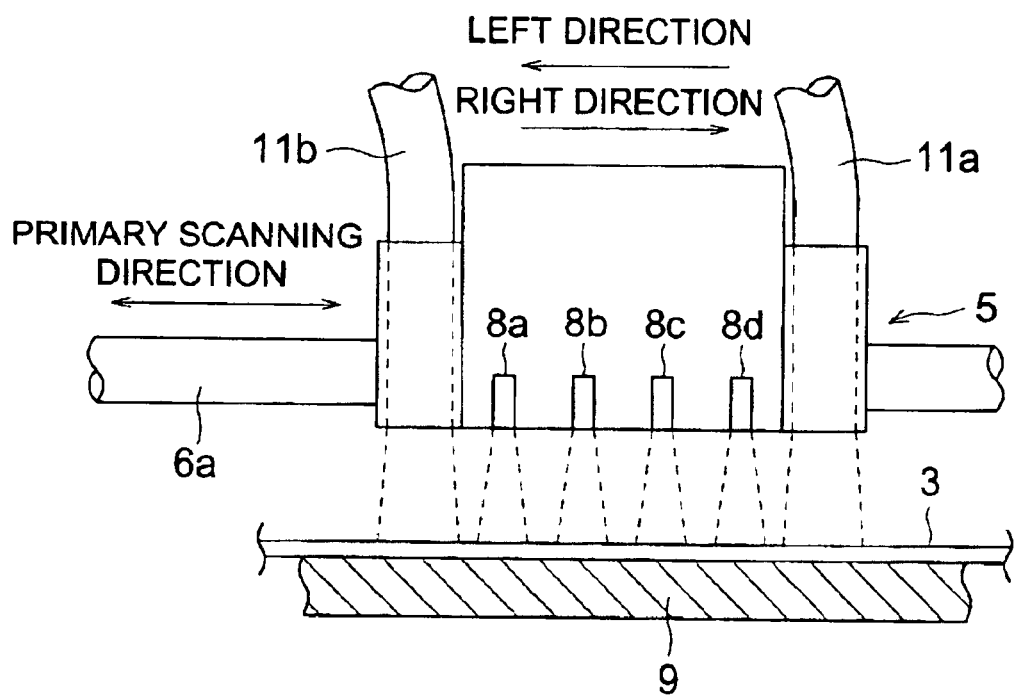
FIG. 3 is an outline front view showing the positional relationship between an ink-jet recording head and the leading edge of an optical fiber and the positional relationship with a heat plate.

FIG. 1 is a perspective view of the whole of the ink-jet present invention, FIG. 2 is an outline plan view showing a positional relationship of the ink-jet recording head and the leading edge of the optical fiber, and a positional relationship to the heat plate, FIG. 3 is an outline front view showing a positional relationship of the ink-jet recording head and the leading edge of the optical fiber, and a positional relationship to the heat plate.

As shown in FIG. 1, an ink-jet printer 1 is located in the upper position of the printer main body 2, and has a sheet feeding section 4 in which a recording material 3 which is a printing medium, is set, a sheet conveying means, not shown, for conveying the recording material 3 set in the sheet feeding section 4 in the secondary scanning direction (same direction as the sheet conveying direction) of an ink-jet recording head 5 at a predetermined speed, an ink-jet recording head 5 to conduct the printing on the recording material 3 conveyed by the sheet conveying means, an ultra violet ray irradiation apparatus A to irradiate the ultraviolet ray as the active ray onto the ink impact position of the active ray curing type of the cation polymerization type jetted by this ink-jet recording head 5, a heat plate 9 which is a heating means for heating the active ray curing type ink which impacts on the recording material, and a sheet delivery section 7 to deliver the recording material 3 which is printed by the ink-jet recording head 5.

The ink-jet recording head 5 is a serial type on demand type, and provided movably between the right position in FIG. 2 and the left position in FIG. 2 along a guide rod 6a of a head moving means 6 in the primary scanning direction (the direction crossing at right angle of the sheet conveying direction). In the right position in FIG. 2, the moving range of an optical fiber 11b of the left side, and in the left position in FIG. 2, the moving range of an optical fiber 11a of the right side are set in such a manner that they are respectively positioned at least on the outer side of the end of the printing area of the recording material 3. The ink-jet recording head 5 has the ink-jet system 4 nozzle head sections 8a–8d, and this 4 nozzle head sections 8a–8d are provided so that they can respectively jet the active ray curing type ink of cation polymerization type of yellow, magenta, cyan, black, onto the recording material 3. The jetting timing of each of nozzle head sections 8a–8d is controlled according to the jetting data.

In FIG. 1, the ultraviolet ray irradiation apparatus A houses the ultraviolet ray lamp, not shown, and has the ultraviolet ray generating section 10 for generating the ultraviolet ray, and 2-system of optical fibers 11a and 11b for guiding the ultraviolet ray generated from this ultraviolet ray generating section 10, and the leading edges of this 2-system of optical fibers 11a and 11b are fixed on both side positions in the primary scanning direction of the ink-jet recording head 5. The optical fibers 11a and 11b are soft and has flexibility, and corresponding to the movement of the ink-jet recording head 5, when the deflection condition is adjusted, the leading edges of the optical fibers 11a and 11b are moved in the primary scanning direction together with the ink-jet recording head 5.

The relationship between the impact position onto the recording material 3 of the active ray curing type ink-jetted from the ink-jet recording head 5, and the irradiation position of the ultraviolet ray of the optical fibers 11a and 11b will be described below. As shown in FIG. 3, the optical fibers 11a and 11b are provided in such a manner that, when the ink-jet recording head 5 is moved from the right to the left direction, the right side optical fiber 11a scans the impact position just after the ink impact, and when the ink-jet recording head 5 is moved from the left to the right direction, the left side optical fiber 11b scans the impact position just after the ink impact. That is, the optical fibers 11a and 11b are positioned in such a manner that the irradiation in each scanning direction of the ink-jet recording head 5 is made in charge of each of 2-system of optical fibers 11a and 11b.

The heat plate 9 is structured as a part of the guide plate by which the recording material 3 of the sheet feeding section 4 is conveying-guided to the sheet delivery section 7 through the printed portion, and is positioned over the downstream of the conveying from the jetting point of the ink-jet recording head 5. The heat plate 9 has the heating element in its inside, and the heat is directly conducted to the closely adhered recording material 3, and the impacted active ray curing type ink is heated.

In the above structure, when the cation polymerization type active ray curing type ink is jetted onto the recording material 3 from the ink-jet recording head 5, the ultraviolet ray follows the active ray curing type ink and is irradiated just after its impact (within 10 sec). Further, the impacted active ray curing type ink is heated by the heat of the heat plate 9. As described above, because the impacted active ray curing type ink receives the ultraviolet ray at the higher temperature than a predetermined temperature, the active ray curing type ink is successively cured even under the much humid environment because the curing reaction is activated. Accordingly, even under the much humid environment, by using the cation polymerization type active ray curing type ink, the fine printing can be performed. Further, even when the recording material 3 in which the ink easily bleeds is used, the ink bleeding is not generated, and the printed matter which is strong for rubbing-off can be obtained.

In this embodiment, the ultraviolet ray irradiation apparatus A has an ultraviolet ray generating section 10 for generating the ultraviolet ray and the optical fibers 11a and 11b for guiding the ultraviolet ray generated from this ultraviolet ray generating section 10 to a near position of the ink-jet type head 5, and because the ultraviolet ray is irradiated from the leading edges of these optical fibers 11a and 11b, the ultraviolet ray is irradiated spot-likely onto the ink impact position in the near distance to the recording material 3, therefore, because a predetermined amount of the ultraviolet ray amount can be sufficiently irradiated by the weak ultraviolet ray, a small sized one, and a low cost one are enough for the ultraviolet ray irradiation apparatus A. Further, because it is not necessary that the ultraviolet ray lamp corresponding to the printing width is prepared, and further, it is not necessary that the ultraviolet ray lamp itself is moved, it is excellent also in the points of safety and durability.

In this embodiment, because the leading edges of the optical fibers 11a and 11b are fixed on the ink-jet recording head 5, they can be interlocked with the printing speed of the ink-jet recording head 5 and can move in the primary scanning direction so that the impact position can be irradiated just after the active ray curing type ink impacts. Accordingly, it is not necessary that the ultraviolet ray generating section 10 is moved, but because only the leading edges of the optical fibers 11a and 11b may be moved, the follow irradiation of the ultraviolet ray can be easily conducted. Further, because it is not necessary that the fiber moving means is specially provided for moving the leading edges of the optical fibers 11a and 11b, it contributes to the prevention of the increase of the number of parts or the easiness of the control.

In this embodiment, 2 systems of the optical fibers 11a and 11b are provided, and because respective of leading edges of these 2 systems of optical fibers 11a and 11b are arranged on both side positions of the ink-jet recording head 5 in the primary scanning direction, and respective of the 2 systems of the optical fibers 11a and 11b are arranged so that they are in charge of the irradiation in each scanning direction of the ink-jet recording head 5, even in the case where the ink-jet recording head 5 scans in any direction, the ultraviolet ray can be effectively irradiated just after the ink impacts. Accordingly, the active ray curing type ink can be cured without changing the irradiation position of the ultraviolet ray which is irradiated from the leading edges of the optical fibers 11a and 11b.

As a modified example of this embodiment, one system of the optical fibers may be provided. However, in the case where it is made correspond to the ink-jet recording head 5 which conducts the printing operation in two ways of the primary scanning direction, it is necessary that the irradiation position of the ultraviolet ray irradiated from the leading edge of the optical fiber is changed so that the ultraviolet ray can be effectively irradiated just after the ink impacts, even in the case where the ink-jet recording head 5 scans in any direction. Hereupon, in the case of the ink-jet recording head 5 which conducts the printing operation only in one direction of the primary scanning direction, of course, it is not necessary that the irradiation position of the ultraviolet ray irradiated from the leading edge of the optical fiber is changed.

Further, the ink-jet recording head may also be made a line type on-demand type, and in this case, a moving means for moving the optical fiber in the primary scanning direction is necessary.

Further, in this embodiment, although the heating means is structured by a heat plate 9, it may also be structured as a hot air blowing means for blowing the hot air to the active ray curing type ink which impacts on the recording material 3. When it is structured in this manner, the hot air is blown to the impacted active ray curing type ink by the hot air blowing means and the active ray curing type ink is heated. Herein, when the hot air blowing means is structured by introducing the heat generated from the ultraviolet ray generating section 10 to the vicinity of the ink-jet recording head 5 by a tube, it is not necessary that the hot air blowing means is separately provided, and it is preferable for reduction of number of parts, size reduction, and cost reduction.

Hereupon, in the above description, although the ink-jet recording head 5 is a head corresponding to the color which has a plurality of nozzle head portions 8a–8d, the head of monochrome having a single nozzle head can also be used.

As a coloring material according to the present invention, the coloring material which can dissolve or disperse in the main component of the polymerization compound, can be used, however, a pigment is preferable from a point of weather-tightness.

The pigments which can be preferably used, will be listed below.

C. I Pigment Yellow—1, 3, 12, 13, 14, 17, 81, 83, 87, 95, 109, 42.
C. I Pigment Orange—16, 36, 38
C. I Pigment Red—5, 22, 38, 48:1, 48:2, 48:4, 49:1, 53:1, 57:1, 63:1, 144, 146, 185, 101.
C. I Pigment Violet—19, 23
C. I Pigment Blue—15:1, 15:3, 15:4, 18, 60, 27, 29
C. I Pigment Green—7, 36
C. I pigment White—6, 18, 21
C. I pigment Black—7

Further, in the present invention, in order to increase the shielding property of the color in the transparent base material such as the plastic film, it is preferable that the white ink is used. Particularly, in the soft package printing, or label printing, it is preferable that the white ink is used, however, because the jetting amount becomes large, from the viewpoint of the jetting stability, and generation of the curl and wrinkle, there is naturally a limitation as for the using amount.

For the dispersion of the pigment, for example, a ball mill, sand mill, attritor mill, roll mill, agitator, Henshel mixer, colloid mill, ultrasonic homogenizer, pearl mill, wet jet mill, or paint shaker can be used. Further, when the pigment is dispersed, a dispersing agent can also be added. As the dispersing agent, it is preferable that the polymeric dispersing agent is used, and as the polymeric dispersing agent, Solsperse series by Avecia Co., are listed. Further, as the dispersion auxiliary, a synergist corresponding to each kind of pigment can also be used. In these dispersing agent and dispersion auxiliary, it is preferable that, to the pigment 100 mass part, 1–50 mass part is added. As dispersion medium, the dispersion is conducted by using the solvent or polymerization compound, however, it is preferable that the active ray curing type ink used in the present invention is no solvent because it is reacted and cured just after the ink impacts. When the solvent remains on the cured image, a problem of the deterioration of the solvent resistance, and VOC of the remaining solvent is generated. Accordingly, it is preferable in the dispersion property that the dispersion medium is not the solvent, but the polymerization compounds, and in them, the monomer whose viscosity is lowest is selected.

In the dispersion of the pigment, it is preferable that the average particle diameter of the pigment particle is 0.08–0.5 μm, maximum particle diameter is 0.3–10 μm, and preferably, the selection of the pigment, dispersing agent and the dispersion medium, and the dispersing condition, and filtering condition are set so that maximum particle diameter is 0.3–3 μm. By this particle diameter control, the choking of the head nozzle can be suppressed, and conservation stability of the ink, ink transparency and curing sensitivity can be maintained.

As the coloring material density of the ink according to the present invention, it is preferable that it is 1–10 weight % of the whole ink.

In the ink according to the present invention, various additive agents can be used other than the above description. For example, the interface active agent, leveling additive agent, mat agent, polyester resin to adjust the film physical properties, polyurethane resin, vinyl resin, acrylic resin, rubber resin, or wax can be added. Further, in order to improve the conservation stability, although all well known basic compounds can be used, as representative compounds, the basic alkali-metal compound, basic alkali earth metal compound, basic organic compound such as amine are listed. Further, the radical polymerization monomer and the initiator are combined, and it can also be made the hybrid type cured ink of the radical·cation.

As the recording material which can be used in the present invention, other than an ordinary non-coat sheet and coat sheet, each kind of non-absorptive plastic used for so-called soft package and its film can be used, and as each kind of plastic film, for example, PET film, OPS film, OPP film, ONy film, PVC film, PE film, or TAC film can be listed. As the other plastic, polycarbonate, acrylic resin, ABS, polyacetal, PVA, or rubber can be used. Further, it can also be applied to metal or glass.

In these recording materials, particularly when the image is formed onto the PET film, OPS film, OPP film, ONy film, PVC film, which are shrinkable by the heat, the structure of the present invention is effective. In these base materials, not only the curl and deformation of the film are easily generated by the heat generation at the time of curing shrinkage and curing reaction of the ink, but the ink film also hardly follows the shrinkage of the base material.

The surface energy of each kind of plastic film is largely different, and conventionally, it is a problem that the dot diameter after the ink impact is changed depending on the recording material. In the structure of the present invention, the good high minute image can be formed on the recording material of the wide range in which the surface energy is $3.5$–$6.0 \times 10^{-2}$ Nm$^{-1}$, including OPP film, OPS film, whose surface energy is low, and PET whose surface energy is comparatively large.

In the present invention, in the point of the cost of the recording material such as the cost of the package or the production cost, and the production efficiency of the print, and in the point in which it can cope with the print of each kind of size, it is advantageous that the long sized (web) recording material is used.

EXAMPLES

The present invention is specifically shown below by examples, but the present invention is not limited to them.

[Adjustment of Ink Compositions]

Ink Composition 1–7

The ink compositions having the composition described in Tables 1–3 and 8–11 were produced as following. In the ink compositions 5–7, water is forcibly added and dissolved.

Steps of Making the Ink:

(1) 5 parts of PB822 (produced by Ajinomoto fine techno company) and a photo polymerization compound of the kind and volume shown in Tables are put in a stainless beaker, and while heated by 65° C. hot plate, stirred and mixed for 1 hour and dissolved.

(2) A pigment of the kind and volume shown in Tables is put into the solution obtained by the step (1). Then the mixture is inserted into the poly ethylene bottle together with zirconia beads 200 g of diameter 1 mm, and tightly plugged and dispersed by paint shaker for 2 hours. The zirconia beads are removed, and a photo initiator, and a sensitizer shown in Tables, are added and stirred and mixed.

(3) This is filtered by a 0.8 μm membrane filter to prevent the printer from blocking, and each ink composition is obtained. The ink compositions of 1 to 3 are each sealed in poly ethylene container under the environment of 20° C., 40% RH to make a comparative sample, and under the environment of 30° C., 80% RH to make an inventive sample.

The ink compositions of 4 to 7 are each sealed in poly ethylene container under the environment of 25° C., 63% RH The water content is measured by Karl-Fischer method, and conserved for 2 weeks at 50° C.

The viscosity of each ink composition was measured at 25° C. and the values are as follows.

Ink 1 and 2: 50 mPa.s
Ink 3: 60 mPa.s
Ink 4: 28–31 mPa.S
Ink 5: 26–30 mPa.S
Ink 6 and 7: 24–27 mPa.s The inks were stored at 25° C. or 50° C. for 2 weeks before the ink-jet recording property were evaluated.

In this connection, the meanings of symbols in the table are as follows.

K: dark black ink, C: dark cyan ink, M: dark magenta ink, Y: dark yellow ink, W: white, Lk: light black ink, Lc: light cyan ink, Lm: light magenta ink, Ly: light yellow ink Coloring material 1: C. I pigment Black 7
Coloring material 2: C. I Pigment Blue 15:3
Coloring material 3: C. I Pigment Red 57:1
Coloring material 4: C. I Pigment Yellow 13
Coloring material 5: titanium dioxide (anatase-type: particle diameter 0.2)

TABLE 1

| | | Ink composition 1 | | | | | | | | |
|---|---|---|---|---|---|---|---|---|---|---|
| | | K | C | M | Y | W | Lk | Lc | Lm | Ly |
| | | | | | Coloring material | | | | | |
| Coloring material | | C 1 5.0 | C 2 2.5 | C 3 3.0 | C 4 2.5 | C 5 5.0 | C 1 1.3 | C 2 0.6 | C 3 0.8 | C 4 0.6 |
| Photo polymerization compound (*1) | DAIMIC S300K (Daisel chem. co.) | 20.0 | 15.0 | 15.0 | 15.0 | 20.0 | 15.0 | 15.0 | 15.0 | 15.0 |
| Photo polymerization compound (*2) | OXT-211 (TOA GOSEI) | 64.4 | 74.4 | 73.9 | 74.4 | 66.4 | 75.6 | 76.3 | 76.1 | 76.3 |
| Acid breeding agent | ACPRES 11 (NIPPON CHEMIX) | 3.0 | 3.0 | 3.0 | 3.0 | 3.0 | 3.0 | 3.0 | 3.0 | 3.0 |
| Basic compound | N-ethyl di-ethanol amine | 0.01 | 0.01 | 0.01 | 0.01 | 0.01 | 0.01 | 0.01 | 0.01 | 0.01 |
| Thermal base generating agent | Thermal base 2 | 0.1 | 0.1 | 0.1 | 0.1 | 0.1 | 0.1 | 0.1 | 0.1 | 0.1 |
| Light and thermal acid generating agent | Initiator 1 | 1.5 | 1.0 | 1.0 | 1.0 | 1.5 | 1.0 | 1.0 | 1.0 | 1.0 |
| Photo acid generating agent | SP152 (ASAHI DENKA Industry) | 5.0 | 3.0 | 3.0 | 3.0 | 3.0 | 3.0 | 3.0 | 3.0 | 3.0 |
| Photo acid generating agent auxiliary | CS7102 (NIPPON SODA) | 1.0 | 1.0 | 1.0 | 1.0 | 1.0 | 1.0 | 1.0 | 1.0 | 1.0 |

*1: Epoxidation soy bean oil
*2: Oxetane compound
C: Coloring material

TABLE 2

| | | Ink composition 2 | | | | | | | | |
|---|---|---|---|---|---|---|---|---|---|---|
| | | K | C | M | Y | W | Lk | Lc | Lm | Ly |
| | | | | | | Coloring material | | | | |
| Coloring material | | C 1<br>5.0 | C 2<br>2.5 | C 3<br>3.0 | C 4<br>2.5 | C 5<br>5.0 | C 1<br>1.3 | C 2<br>0.6 | C 3<br>0.8 | C 4<br>0.6 |
| Photo polymerization compound (*3) | EPOREED PB3600 (Daisel chem. co.) | 12.4 | 23.9 | 23.4 | 23.9 | 15.9 | 25.2 | 25.8 | 25.7 | 25.8 |
| Photo polymerization compound (*4) | OXT-221 (TOA GOSEI) | 70.0 | 65.0 | 65.0 | 65.0 | 70.0 | 65.0 | 65.0 | 65.0 | 65.0 |
| Acid breeding agent | Compound 1 | 3.0 | 1.5 | 1.5 | 1.5 | 1.5 | 1.5 | 1.5 | 1.5 | 1.5 |
| Thermal base generating agent | Thermal base 1 | 0.1 | 0.1 | 0.1 | 0.1 | 0.1 | 0.1 | 0.1 | 0.1 | 0.1 |
| Light and thermal acid generating agent | Initiator 2 | 1.5 | 1.0 | 1.0 | 1.0 | 1.5 | 1.0 | 1.0 | 1.0 | 1.0 |
| Photo acid generating agent | C15102 (NIPPON SODA) | 5.0 | 3.0 | 3.0 | 3.0 | 3.0 | 3.0 | 3.0 | 3.0 | 3.0 |
| Photo acid generating agent auxiliary | CS7001 (NIPPON SODA) | 3.0 | 3.0 | 3.0 | 3.0 | 3.0 | 3.0 | 3.0 | 3.0 | 3.0 |

*3: Epoxidation poly-butadiene
*4: Mono-functional oxetane compound
C: Coloring material

TABLE 3

| | | Ink composition 3 | | | | | | | | |
|---|---|---|---|---|---|---|---|---|---|---|
| | | K | C | M | Y | W | Lk | Lc | Lm | Ly |
| | | | | | | Coloring material | | | | |
| Coloring material | | C 1<br>5.0 | C 2<br>2.5 | C 3<br>3.0 | C 4<br>2.5 | C 5<br>5.0 | C 1<br>1.3 | C 2<br>0.6 | C 3<br>0.8 | C 4<br>0.6 |
| Photo polymerization compound (*5) | ADEKASIZER-0-130P (ASAHI DENKA Industry) | 26.9 | 24.4 | 23.9 | 24.4 | 26.9 | 25.6 | 26.3 | 26.1 | 26.3 |
| Photo polymerization compound (*6) | OXT-221 (TOA GOSEI) | 60.0 | 65.0 | 65.0 | 65.0 | 60.0 | 65.0 | 65.0 | 65.0 | 65.0 |
| Acid breeding agent | compound 2 | 3.0 | 3.0 | 3.0 | 3.0 | 3.0 | 3.0 | 3.0 | 3.0 | 3.0 |
| Basic compound | N-ethyl di-ethanol amine | 0.01 | 0.01 | 0.01 | 0.01 | 0.01 | 0.01 | 0.01 | 0.01 | 0.01 |
| Thermal base generating agent | Thermal base 2 | 0.1 | 0.1 | 0.1 | 0.1 | 0.1 | 0.1 | 0.1 | 0.1 | 0.1 |
| Light and thermal acid generating agent | Initiator 3 | 2.5 | 2.5 | 2.5 | 2.5 | 2.5 | 2.5 | 2.5 | 2.5 | 2.5 |
| Photo acid generating agent | Initiator 4 | 2.5 | 2.5 | 2.5 | 2.5 | 2.5 | 2.5 | 2.5 | 2.5 | 2.5 |

*5: Epoxidation soy bean oil
*4: Mono-functional oxetane compound
C: Coloring material

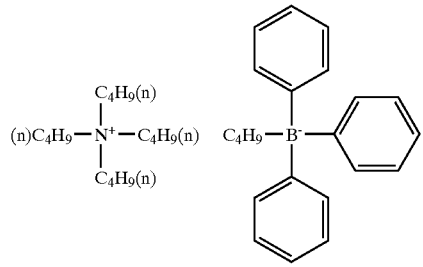

Thermal base 1

Thermal base 2

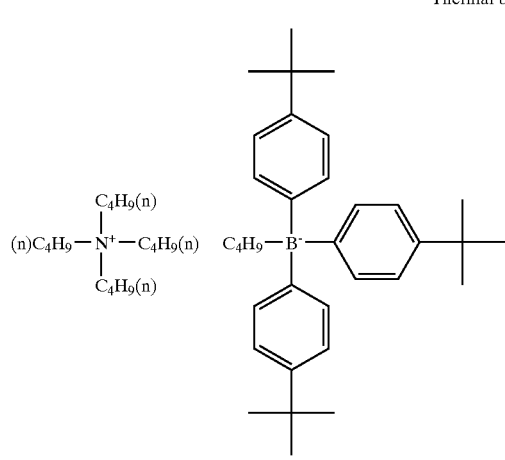

Initiator 1

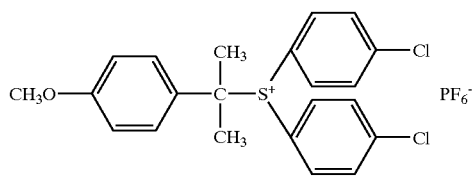

Initiator 2

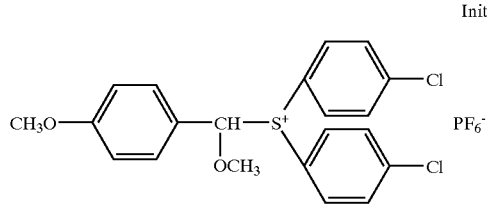

Compound 1

Ts: 

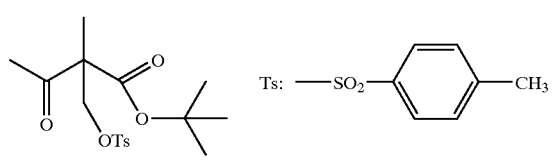

Initiator 3

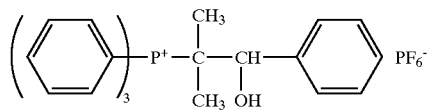

Compound 2

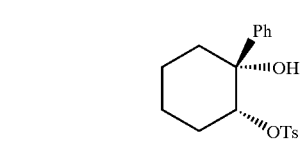

Initiator 4

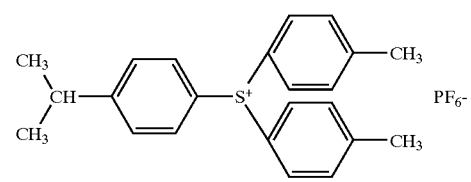

TABLE 8

| | | Ink composition 4 (comparison) Each color viscosity 28–31 mPa · s (25° C.) | | | | | | | |
|---|---|---|---|---|---|---|---|---|---|
| | | K | C | M | Y | W | Lk | Lc | Lm | Ly |
| | | | | | | Coloring material | | | | |
| Coloring material | | *1 4.0 | *2 4.0 | *3 5.0 | *4 5.0 | *5 5.0 | *1 1.0 | *2 1.0 | *3 1.3 | *4 1.3 |
| Photo polymerization compound (alicyclic epoxy compound) | Celloxide 2021P (Daiseru kagaku) | 15.0 | 10.0 | 9.0 | 9.0 | 14.0 | 13.0 | 13.0 | 12.7 | 12.7 |
| Photo polymerization compound (epoxidized linseed oil) | Vikaflex 9040 (ATOFINA) | 15.0 | 15.0 | 15.0 | 15.0 | 15.0 | 15.0 | 15.0 | 15.0 | 15.0 |
| Photo polymerization compound (oxetane compound) | OXT-221 (Toa gosei) | 50.0 | 55.0 | 55.0 | 55.0 | 50.0 | 55.0 | 55.0 | 55.0 | 55.0 |
| Acid breeder | Acpress 11M (Nippon Chemics) | 1.0 | 1.0 | 1.0 | 1.0 | 1.0 | 1.0 | 1.0 | 1.0 | 1.0 |

TABLE 8-continued

Ink composition 4 (comparison) Each color viscosity 28–31 mPa · s (25° C.)

| Coloring material | | K | C | M | Y | W | Lk | Lc | Lm | Ly |
|---|---|---|---|---|---|---|---|---|---|---|
| | | | | | | Coloring material | | | | |
| Coloring material | | *1 4.0 | *2 4.0 | *3 5.0 | *4 5.0 | *5 5.0 | *1 1.0 | *2 1.0 | *3 1.3 | *4 1.3 |
| Fluoro nonionic surface active agent | Megafac F178 k (Dainippon Ink Chem. Co.) | 0.02 | 0.02 | 0.02 | 0.02 | 0.02 | 0.02 | 0.02 | 0.02 | 0.02 |
| Fluoro nonionic surface active agent | Megafac F1405 (Dainippon Ink Chem. Co.) | 0.02 | 0.02 | 0.02 | 0.02 | 0.02 | 0.02 | 0.02 | 0.02 | 0.02 |
| γ-caprolactone | Reagent (Kanto kagaku) | 5.00 | 5.00 | 5.00 | 5.00 | 5.00 | 5.00 | 5.00 | 5.00 | 5.00 |
| Photo oxidation generator | UV16992 (DAW Chemical) | 5.0 | 5.0 | 5.0 | 5.0 | 5.0 | 5.0 | 5.0 | 5.0 | 5.0 |
| Dispersant | PB822 (Ajinomoto fine techno) | 5.0 | 5.0 | 5.0 | 5.0 | 5.0 | 5.0 | 5.0 | 5.0 | 5.0 |

*1: C.I. pigment Black-7,
*2: C.I. pigment Blue-15:3,
*3: C.I. pigment Red-57:1,
*4: C.I. pigment yellow-13
*5: Titanium oxide (anatase type average particle size 0.20 μm)

TABLE 9

Ink composition 5 (Present invention) Each color viscosity 28–31 mPa · s (25° C.)

| Coloring material | | K | C | M | Y | W | Lk | Lc | Lm | Ly |
|---|---|---|---|---|---|---|---|---|---|---|
| | | | | | | Coloring material | | | | |
| Coloring material | | *1 4.0 | *2 4.0 | *3 5.0 | *4 5.0 | *5 5.0 | *1 1.0 | *2 1.0 | *3 1.3 | *4 1.3 |
| Photo polymerization compound (alicyclic epoxy compound) | Celloxide 2021P (Daiseru kagaku) | 13.8 | 8.8 | 7.8 | 7.8 | 12.8 | 11.8 | 11.8 | 11.5 | 11.5 |
| Photo polymerization compound (epoxidized linseed oil) | Vikaflex 9040 (ATOFINA) | 15.0 | 15.0 | 15.0 | 15.0 | 15.0 | 15.0 | 15.0 | 15.0 | 15.0 |
| Photo polymerization compound (oxetane compound) | OXT-221 (Toa gosei) | 47.0 | 52.0 | 52.0 | 52.0 | 47.0 | 52.0 | 52.0 | 52.0 | 52.0 |
| Water | | 4.2 | 4.2 | 4.2 | 4.2 | 4.2 | 4.2 | 4.2 | 4.2 | 4.2 |
| Acid breeder | Acpress 11M (Nippon Chemics) | 1.0 | 1.0 | 1.0 | 1.0 | 1.0 | 1.0 | 1.0 | 1.0 | 1.0 |
| Fluoro nonionic surface active agent | Megafac F178 k (Dainippon Ink Chem. Co.) | 0.02 | 0.02 | 0.02 | 0.02 | 0.02 | 0.02 | 0.02 | 0.02 | 0.02 |
| Fluoro nonionic surface active agent | Megafac F1405 (Dainippon Ink Chem. Co.) | 0.02 | 0.02 | 0.02 | 0.02 | 0.02 | 0.02 | 0.02 | 0.02 | 0.02 |
| γ-caprolactone | Reagent (Kanto kagaku) | 5.00 | 5.00 | 5.00 | 5.00 | 5.00 | 5.00 | 5.00 | 5.00 | 5.00 |
| Photo oxidation generator | UV16992 (DAW Chemical) | 5.0 | 5.0 | 5.0 | 5.0 | 5.0 | 5.0 | 5.0 | 5.0 | 5.0 |
| Dispersant | PB822 (Ajinomoto fine techno) | 5.0 | 5.0 | 5.0 | 5.0 | 5.0 | 5.0 | 5.0 | 5.0 | 5.0 |

*1: C.I. pigment Black-7,
*2: C.I. pigment Blue-15:3,
*3: C.I. pigment Red-57:1,
*4: C.I. pigment yellow-13
*5: Titanium oxide (anatase type average particle size 0.20 μm)

TABLE 10

Ink composition 6 (Comparison) each color viscosity 24–27 mPa · s (25° C.)

| | | K | C | M | Y | W | Lk | Lc | Lm | Ly |
| --- | --- | --- | --- | --- | --- | --- | --- | --- | --- | --- |
| | | | | | | Coloring material | | | | |
| Coloring material | | *1<br>4.0 | *2<br>4.0 | *3<br>5.0 | *4<br>5.0 | *5<br>5.0 | *1<br>1.0 | *2<br>1.0 | *3<br>1.3 | *4<br>1.3 |
| photo polymerization compound (alicyclic epoxy compound) | Vikoflex 7010 (ATOFINA) | 30.0 | 30.0 | 30.0 | 30.0 | 30.0 | 30.0 | 30.0 | 30.0 | 30.0 |
| Photo polymerization compound (oxetane compound) | Compound E-1 | 20.0 | 20.0 | 20.0 | 20.0 | 20.0 | 20.0 | 20.0 | 20.0 | 20.0 |
| Photo polymerization compound (oxetane compound) | OXT-221 (Toa gosei) | 21.9 | 21.9 | 20.9 | 20.9 | 20.9 | 24.9 | 24.9 | 26.6 | 24.6 |
| Water | | 6.0 | 6.0 | 6.0 | 6.0 | 6.0 | 6.0 | 6.0 | 6.0 | 6.0 |
| Acid breeder | Acpress 11M (Nippon Chemics) | 3.0 | 3.0 | 3.0 | 3.0 | 3.0 | 3.0 | 3.0 | 3.0 | 3.0 |
| Basic compound | N-ethyl di-ethanol amine | 0.01 | 0.01 | 0.01 | 0.01 | 0.01 | 0.01 | 0.01 | 0.01 | 0.01 |
| Thermal base generator | Thermal base 2 | 0.1 | 0.1 | 0.1 | 0.1 | 0.1 | 0.1 | 0.1 | 0.1 | 0.1 |
| Fluoro nonionic surface active agent | Megafac F470 (Dainippon Ink Chem. Co.) | 0.02 | 0.02 | 0.02 | 0.02 | 0.02 | 0.02 | 0.02 | 0.02 | 0.02 |
| Fluoro nonionic surface active agent | Megafac EXP. TF907 (Dainippon Ink Chem. Co.) | 0.02 | 0.02 | 0.02 | 0.02 | 0.02 | 0.02 | 0.02 | 0.02 | 0.02 |
| Propylene carbonate | Reagent (Kanto kagaku) | 5.00 | 5.00 | 5.00 | 5.00 | 5.00 | 5.00 | 5.00 | 5.00 | 5.00 |
| Photo oxidation generator | Initiator 5 | 5.0 | 5.0 | 5.0 | 5.0 | 5.0 | 5.0 | 5.0 | 5.0 | 5.0 |
| Dispersant | PB822 (Ajinomoto fine techno) | 5.0 | 5.0 | 5.0 | 5.0 | 5.0 | 5.0 | 5.0 | 5.0 | 5.0 |

*1: C.I. pigment Black-7,
*2: C.I. pigment Blue-15:3,
*3: C.I. pigment Red-57:1,
*4: C.I. pigment yellow-13
*5: Titanium oxide (anatase type average particle size 0.20 μm)

TABLE 11

Ink composition 7 (Present invention) each color viscosity 24–27 mPa · s (25° C.)

| | | K | C | M | Y | W | Lk | Lc | Lm | Ly |
| --- | --- | --- | --- | --- | --- | --- | --- | --- | --- | --- |
| | | | | | | Coloring material | | | | |
| Coloring material | | *1<br>4.0 | *2<br>4.0 | *3<br>5.0 | *4<br>5.0 | *5<br>5.0 | *1<br>1.0 | *2<br>1.0 | *3<br>1.3 | *4<br>1.3 |
| Photo polymerization compound (alicyclic epoxy compound) | Vikoflex 7010 (ATOFINA) | 30.0 | 30.0 | 30.0 | 30.0 | 30.0 | 30.0 | 30.0 | 30.0 | 30.0 |
| Photo polymerization compound (oxetane compound) | Compound E-1 | 20.0 | 20.0 | 20.0 | 20.0 | 20.0 | 20.0 | 20.0 | 20.0 | 20.0 |
| Photo polymerization compound (oxetane compound) | OXT-221 (Toa gosei) | 24.4 | 24.4 | 23.4 | 23.4 | 23.4 | 27.4 | 27.4 | 27.1 | 27.1 |
| Water | | 3.5 | 3.5 | 3.5 | 3.5 | 3.5 | 3.5 | 3.5 | 3.5 | 3.5 |
| Acid breeder | Acpress 11M (Nippon Chemics) | 3.0 | 3.0 | 3.0 | 3.0 | 3.0 | 3.0 | 3.0 | 3.0 | 3.0 |
| Basic compound | N-ethyl di-ethanol amine | 0.01 | 0.01 | 0.01 | 0.01 | 0.01 | 0.01 | 0.01 | 0.01 | 0.01 |
| Thermal base generator | Thermal base 2 | 0.1 | 0.1 | 0.1 | 0.1 | 0.1 | 0.1 | 0.1 | 0.1 | 0.1 |

TABLE 11-continued

Ink composition 7 (Present invention) each color viscosity 24–27 mPa·s (25° C.)

| Coloring material | | K | C | M | Y | W | Lk | Lc | Lm | Ly |
|---|---|---|---|---|---|---|---|---|---|---|
| | | | | | | Coloring material | | | | |
| | | *1 | *2 | *3 | *4 | *5 | *1 | *2 | *3 | *4 |
| Coloring material | | 4.0 | 4.0 | 5.0 | 5.0 | 5.0 | 1.0 | 1.0 | 1.3 | 1.3 |
| Fluoro nonionic surface active agent | Megafac F470 (Dainippon Ink Chem. Co.) | 0.02 | 0.02 | 0.02 | 0.02 | 0.02 | 0.02 | 0.02 | 0.02 | 0.02 |
| Fluoro nonionic surface active agent | Megafac EXP. TF907 (Dainippon Ink Chem. Co.) | 0.02 | 0.02 | 0.02 | 0.02 | 0.02 | 0.02 | 0.02 | 0.02 | 0.02 |
| Propylene carbonate | Reagent (Kanto kagaku) | 5.00 | 5.00 | 5.00 | 5.00 | 5.00 | 5.00 | 5.00 | 5.00 | 5.00 |
| Photo oxidation generator | Initiator 5 | 5.0 | 5.0 | 5.0 | 5.0 | 5.0 | 5.0 | 5.0 | 5.0 | 5.0 |
| Dispersant | PB822 (Ajinomoto fine techno) | 5.0 | 5.0 | 5.0 | 5.0 | 5.0 | 5.0 | 5.0 | 5.0 | 5.0 |

*1: C.I. pigment Black-7,
*2: C.I. pigment Blue-15:3,
*3: C.I. pigment Red-57:1,
*4: C.I. pigment yellow-13
*5: Titanium oxide (anatase type average particle size 0.20 μm)

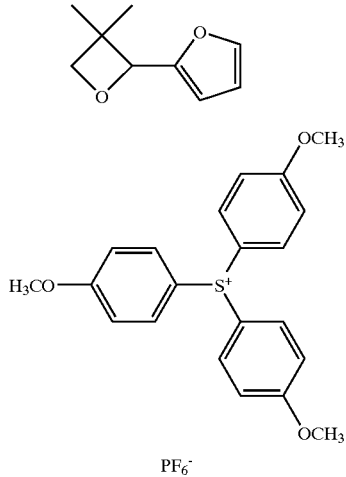

Compound E-1

Initiator 5

K: dark black ink

C: dark cyan ink

M: dark magenta ink

Y: dark yellow ink

W: white

Lk: light black ink

Lc: light cyan ink

Lm: light magenta ink

Ly: light yellow ink

Coloring material 1: C.I. pigment Black—7

Coloring material 2: C.I. pigment Blue—15: 3

Coloring material 3: C.I. pigment Red—57: 1

Coloring material 4: C.I. pigment yellow—13

Coloring material 5: titanium oxide (anatase type average particle diameter: 0.20 μm)

TABLE 4

| Sample No. | Ink | Water content (weight %) at the time of ink conservation | Ink conservation temperature (2 weeks) (° C.) | Recording material | Surface energy (× $10^{-3}$ $Nm^{-1}$) | Recording material surface temperature ° C. |
|---|---|---|---|---|---|---|
| 1 | Ink comp. 1 | 0.8 | 25 | OPP | 38 | *3 (25) |
| 2 | Ink comp. 1 | 0.8 | 25 | PET | 53 | *3 (25) |
| 3 | Ink comp. 1 | 0.8 | 25 | shrink OPS | 39 | *3 (25) |
| 4 | Ink comp. 1 | 0.8 | 25 | *1 | *2 | *3 (25) |
| 5 | Ink comp. 1 | 0.8 | 50 | OPP | 38 | *3 (25) |
| 6 | Ink comp. 1 | 0.8 | 50 | PET | 53 | *3 (25) |
| 7 | Ink comp. 1 | 0.8 | 50 | shrink OPS | 39 | *3 (25) |
| 8 | Ink comp. 1 | 0.8 | 50 | *1 | *2 | *3 (25) |
| 9 | Ink comp. 1 | 2.3 | 25 | OPP | 38 | *3 (25) |
| 10 | Ink comp. 1 | 2.3 | 25 | PET | 53 | *3 (25) |
| 11 | Ink comp. 1 | 2.3 | 25 | shrink OPS | 39 | *3 (25) |
| 12 | Ink comp. 1 | 2.3 | 25 | *1 | *2 | *3 (25) |
| 13 | Ink comp. 1 | 2.3 | 50 | OPP | 38 | *3 (25) |
| 14 | Ink comp. 1 | 2.3 | 50 | PET | 53 | *3 (25) |

TABLE 4-continued

| Sample No. | Ink | Water content (weight %) at the time of ink conservation | Ink conservation temperature (2 weeks) (° C.) | Recording material | Surface energy (× 10⁻³ Nm⁻¹) | Recording material surface temperature ° C. |
|---|---|---|---|---|---|---|
| 15 | Ink comp. 1 | 2.3 | 50 | shrink OPS | 39 | *3 (25) |
| 16 | Ink comp. 1 | 2.3 | 50 | *1 | *2 | *3 (25) |
| 17 | Ink comp. 2 | 1.0 | 50 | OPP | 38 | *3 (25) |
| 18 | Ink comp. 2 | 1.0 | 50 | PET | 53 | *3 (25) |
| 19 | Ink comp. 2 | 1.0 | 50 | shrink OPS | 39 | *3 (25) |
| 20 | Ink comp. 2 | 1.0 | 50 | *1 | *2 | *3 (25) |
| 21 | Ink comp. 2 | 2.5 | 50 | OPP | 38 | 40 |
| 22 | Ink comp. 2 | 2.5 | 50 | PET | 53 | 40 |
| 23 | Ink camp. 2 | 2.5 | 50 | shrink OPS | 39 | 40 |
| 24 | Ink comp. 2 | 2.5 | 50 | *1 | *2 | 40 |
| 25 | Ink comp. 3 | 0.5 | 50 | OPP | 38 | 40 |
| 26 | Ink comp. 3 | 0.5 | 50 | PET | 53 | 40 |
| 27 | Ink comp. 3 | 0.5 | 50 | shrink OPS | 39 | 40 |
| 28 | Ink comp. 3 | 0.5 | 50 | *1 | *2 | 40 |
| 29 | Ink comp. 3 | 2.1 | 50 | OPP | 38 | 40 |
| 30 | Ink comp. 3 | 2.1 | 50 | PET | 53 | 40 |
| 31 | Ink comp. 3 | 2.1 | 50 | shrink OPS | 39 | 40 |
| 32 | Ink comp. 3 | 2.1 | 50 | *1 | *2 | 40 |
| 33 | Ink comp. 4 | 0.7 | 50 | OPP | 38 | *3 (25) |
| 34 | Ink comp. 4 | 0.7 | 50 | PET | 53 | *3 (25) |
| 35 | Ink comp. 4 | 0.7 | 50 | shrink OPS | 39 | *3 (25) |
| 36 | Ink comp. 4 | 0.7 | 50 | *1 | *2 | *3 (25) |
| 37 | Ink comp. 5 | 4.5 | 50 | OPP | 38 | *3 (25) |
| 38 | Ink comp. 5 | 4.5 | 50 | PET | 53 | *3 (25) |
| 39 | Ink comp. 5 | 4.5 | 50 | shrink OPS | 39 | *3 (25) |
| 40 | Ink comp. 5 | 4.5 | 50 | *1 | *2 | *3 (25) |
| 41 | Ink comp. 6 | 6.5 | 50 | OPP | 38 | *3 (25) |
| 42 | Ink comp. 6 | 6.5 | 50 | PET | 53 | *3 (25) |
| 43 | Ink comp. 6 | 6.5 | 50 | shrink OPS | 39 | *3 (25) |
| 44 | Ink comp. 6 | 6.5 | 50 | *1 | *2 | *3 (25) |
| 45 | Ink comp. 7 | 4 | 50 | OPP | 38 | *3 (25) |
| 46 | Ink comp. 7 | 4 | 50 | PET | 53 | *3 (25) |
| 47 | Ink comp. 7 | 4 | 50 | shrink OPS | 39 | *3 (25) |
| 48 | Ink comp. 7 | 4 | 50 | *1 | *2 | *3 (25) |

OPP: Oriented polypropylene,
ONy: Oriented nylon,
PET: Polyester
OPS: Oriented polyester,
PVC: Polyvinyl chloride
*1: Cast coat sheet,
*2: Absorptive recording material,
*3: no heating

TABLE 5

| | | Irradiation condition | | | | |
|---|---|---|---|---|---|---|
| Sample No. | Irradiation light source | Irradiation timing, 0.2 sec later after ink impact | Irradiation manner (area) | Maximum illumination on recording material surface and peak wavelength 650 mW/cm² at 365 nm | Energy and peak wavelength 180 mJ/cm² at 365 nm | Note |
| 1 | *6 | 0.2 | *7 | 650 | 180 | Comp. |
| 2 | *6 | 0.2 | *7 | 650 | 180 | Comp. |
| 3 | *6 | 0.2 | *7 | 650 | 180 | Comp. |
| 4 | *6 | 0.2 | *7 | 650 | 180 | Comp. |
| 5 | *6 | 0.2 | *7 | 650 | 180 | Comp. |
| 6 | *6 | 0.2 | *7 | 650 | 180 | Comp. |
| 7 | *6 | 0.2 | *7 | 650 | 180 | Comp. |
| 8 | *6 | 0.2 | *7 | 650 | 180 | Comp. |
| 9 | *6 | 0.2 | *7 | 650 | 180 | Inv. |
| 10 | *6 | 0.2 | *7 | 650 | 180 | Inv. |
| 11 | *6 | 0.2 | *7 | 650 | 180 | Inv. |
| 12 | *6 | 0.2 | *7 | 650 | 180 | Inv. |
| 13 | *6 | 0.2 | *7 | 650 | 180 | Inv. |
| 14 | *6 | 0.2 | *7 | 650 | 180 | Inv. |
| 15 | *6 | 0.2 | *7 | 650 | 180 | Inv. |
| 16 | *6 | 0.2 | *7 | 650 | 180 | Inv. |

TABLE 5-continued

| Sample No. | Irradiation light source | Irradiation timing, 0.2 sec later after ink impact | Irradiation manner (area) | Maximum illumination on recording material surface and peak wavelength 650 mW/cm² at 365 nm | Energy and peak wavelength 180 mJ/cm² at 365 nm | Note |
|---|---|---|---|---|---|---|

*6: 120 W/cm metal halide lamp (by Nippon denchi, MAL 400 NL) 3 kW power source
*7: Both sides of recording head, line light source irradiation
Comp.: Comparative example,
Inv.: Present invention

TABLE 6

| Sample No. | Irradiation light source | Irradiation timing, 0.2 sec later after ink impact | Irradiation manner (area) | Maximum illumination on recording material surface and peak wavelength 10 mW/cm² at 306 nm | Energy and peak wavelength 38 mJ/cm² at 306 nm | Note |
|---|---|---|---|---|---|---|
| 17 | *8 | 0.2 | *9 | 10 | 38 | Comp. |
| 18 | *8 | 0.2 | *9 | 10 | 38 | Comp. |
| 19 | *8 | 0.2 | *9 | 10 | 38 | Comp. |
| 20 | *8 | 0.2 | *9 | 10 | 38 | Comp. |
| 21 | *8 | 0.2 | *9 | 10 | 38 | Inv. |
| 22 | *8 | 0.2 | *9 | 10 | 38 | Inv. |
| 23 | *8 | 0.2 | *9 | 10 | 38 | Inv. |
| 24 | *8 | 0.2 | *9 | 10 | 38 | Inv. |
| 25 | *8 | 0.2 | *9 | 10 | 38 | Comp. |
| 26 | *8 | 0.2 | *9 | 10 | 38 | Comp. |
| 27 | *8 | 0.2 | *9 | 10 | 38 | Comp. |
| 28 | *8 | 0.2 | *9 | 10 | 38 | Comp. |
| 29 | *8 | 0.2 | *9 | 10 | 38 | Inv. |
| 30 | *8 | 0.2 | *9 | 10 | 38 | Inv. |
| 31 | *8 | 0.2 | *9 | 10 | 38 | Inv. |
| 32 | *8 | 0.2 | *9 | 10 | 38 | Inv. |

*8: Cool cathode tube (by Hipec, special order) electric power of power source: not larger than 1 kW · Hr
*9: Both sides of recording head, irradiation by respective 8 line light sources
Comp.: Comparative example, Inv.: More preferable present invention

| Sample No. | Irradiation light source | Irradiation timing, 0.2 sec later after ink impact | Irradiation manner (area) | Maximum illumination on recording material surface and peak wavelength 10 mW/cm² at 306 nm | Energy and peak wavelength 38 mJ/cm² at 306 nm | Note |
|---|---|---|---|---|---|---|
| 33 | *10 | 0.2 | *11 | 10 | 38 | Comp. |
| 34 | *10 | 0.2 | *11 | 10 | 38 | Comp. |
| 35 | *10 | 0.2 | *11 | 10 | 38 | Comp. |
| 36 | *10 | 0.2 | *11 | 10 | 38 | Comp. |
| 37 | *10 | 0.2 | *11 | 10 | 38 | Inv. |
| 38 | *10 | 0.2 | *11 | 10 | 38 | Inv. |
| 39 | *10 | 0.2 | *11 | 10 | 38 | Inv. |
| 40 | *10 | 0.2 | *11 | 10 | 38 | Inv. |
| 41 | *10 | 0.2 | *11 | 10 | 38 | Comp. |
| 42 | *10 | 0.2 | *11 | 10 | 38 | Comp. |
| 43 | *10 | 0.2 | *11 | 10 | 38 | Comp. |
| 44 | *10 | 0.2 | *11 | 10 | 38 | Comp. |
| 45 | *10 | 0.2 | *11 | 10 | 38 | Inv. |
| 46 | *10 | 0.2 | *11 | 10 | 38 | Inv. |
| 47 | *10 | 0.2 | *11 | 10 | 38 | Inv. |
| 48 | *10 | 0.2 | *11 | 10 | 38 | Inv. |

*10: Thermal cathode ray tube (Nippo Electric CO.) Electric power of power source: not larger than 1 kW · Hr
*11: Both sides of recording head, irradiation by respective 5 line light sources
Comp.: Comparative example, Inv.: Present invention

[Ink-jet Recording]

By the ink-jet recording apparatus using the piezoelectric type ink-jet nozzle, the image recording is conducted on the recording material of the width of 600 mm having the surface energy written in Table 4. The ink supply system is composed of an ink tank, supply pipe, front chamber ink tank just before the head, piping with a filter, and piezoelectric head. The recording head section is temperature-adjusted to 55° C. Further, the ink supply system from the ink container to the ink tank and the recording head is made a sealing system. The piezoelectric head is driven so that the multi size dot of 2–15 pl can be jetted in the resolution of 720×720 dpi (dpi expresses the number of dots per 1 inch, that is, 2.54 cm) and the ink is jetted. The irradiation condition after the ink impact is as shown in Tables 5 and 6. Further, the recording material after the ink impact is heated by the conveying guide plate, and the recording material surface is made as shown in Tables 5 and 6. After the recording, when the total ink film thickness is measured, it is 2.3–13 μm.

[Evaluation]

The result of the recording under the environment of 10° C., 20% RH, the recording under the environment of 25° C., 50% RH, and the recording under the environment of 32° C., 80% RH is shown in Table 7.

[Character Quality]

A 6 point MS Minchotai character is printed in each target density of YMCK, and the roughness of the character is enlarged-evaluated by a loupe.

A . . . no roughness is observed
B . . . roughness is slightly observed
C . . . roughness is observed, but can be discriminated as the character, and in a level in which it can barely be used
D . . . much roughness, and in a level in which the character is blurred and can not be used

[Color Mixing]

Adjoining each color dot in the printed high minute image is enlarged by the loupe, and the bleeding situation is visually evaluated.

A . . . adjoining dot shape keeps true circle, and no bleeding
B . . . adjoining dot shape keeps almost true circle, and almost no bleeding
C . . . adjoining dots are slightly bled and the dot shape is slightly broken, and in a level in which it can be barely used.
D . . . adjoining dots are bled and mixed and in a level in which it can not be used.

TABLE 7

| Sample No. | 10° C., 20% RH | | 25° C., 50% RH | | 32° C., 80% RH | | Note |
|---|---|---|---|---|---|---|---|
| | Character quality | Color mixing (bleeding) | Character quality | Color mixing (bleeding) | Character quality | Color mixing (bleeding) | |
| 1 | B | B | B | B | C | B | *1 |
| 2 | B | B | B | B | B | C | *1 |
| 3 | B | B | B | B | C | B | *1 |
| 4 | B | B | B | B | B | C | *1 |
| 5 | D | C | D | D | D | D | *1 |
| 6 | C | D | D | D | D | D | *1 |
| 7 | D | C | D | D | D | D | *1 |
| 8 | C | D | D | D | D | D | *1 |
| 9 | B | B | B | B | B | B | *2 |
| 10 | B | B | B | C | B | C | *2 |
| 11 | B | B | B | B | B | B | *2 |
| 12 | B | B | B | B | B | C | *2 |
| 13 | B | B | B | B | C | B | *2 |

TABLE 7-continued

| Sample No. | 10° C., 20% RH | | 25° C., 50% RH | | 32° C., 80% RH | | Note |
|---|---|---|---|---|---|---|---|
| | Character quality | Color mixing (bleeding) | Character quality | Color mixing (bleeding) | Character quality | Color mixing (bleeding) | |
| 14 | B | C | B | C | B | C | *2 |
| 15 | B | B | B | B | C | B | *2 |
| 16 | B | B | B | B | B | C | *2 |
| 17 | D | B | D | C | D | C | *1 |
| 18 | C | C | C | C | C | D | *1 |
| 19 | C | B | C | B | D | C | *1 |
| 20 | C | B | C | C | D | D | *1 |
| 21 | C | B | C | B | B | B | *3 |
| 22 | B | B | B | A | B | A | *3 |
| 23 | A | A | A | A | A | A | *3 |
| 24 | A | A | A | A | A | A | *3 |
| 25 | C | B | D | C | D | C | *1 |
| 26 | C | C | C | D | C | D | *1 |
| 27 | C | B | D | C | D | C | *1 |
| 28 | C | B | D | C | D | D | *1 |
| 29 | B | A | B | A | B | A | *3 |
| 30 | A | A | A | B | A | B | *3 |
| 31 | A | A | A | A | A | B | *3 |
| 32 | A | B | A | B | A | B | *3 |
| 33 | B | A | C | B | C | C | *1 |
| 34 | A | B | B | C | C | C | *1 |
| 35 | B | A | C | B | C | C | *1 |
| 36 | A | B | B | C | C | C | *1 |
| 37 | A | A | A | A | B | A | *2 |
| 38 | A | A | A | A | A | B | *2 |
| 39 | A | A | A | A | B | A | *2 |
| 40 | A | A | A | A | A | B | *2 |
| 41 | C | B | C | C | C | C | *1 |
| 42 | B | C | C | C | C | C | *1 |
| 43 | C | B | C | C | C | C | *1 |
| 44 | B | C | C | C | C | C | *1 |
| 45 | A | A | A | A | B | A | *2 |
| 46 | A | A | A | B | A | B | *2 |
| 47 | A | A | A | A | B | A | *2 |
| 48 | A | A | A | A | A | B | *2 |

*1: Comparative example
*2: Present invention
*3: More preferable present invention From Table 7, it is clear that the samples according to the present invention are more excellent than the comparative example in the character quality and the generation of color mixing.

According to the present invention, the high minute ink-jet image which is excellent in the character quality and in which there is no generation of the color mixing, can be presented.

What is claimed is:

1. A method for preserving an ink-jet ink, comprising a step of:

keeping the ink-jet ink in a sealed container having a ratio of water of 1.50 to 5.00 weight % measured with Karl-Fischer method in an inside portion of the sealed container, wherein the ink-jet ink comprises a cationic polymerizable monomer and an initiator, provided that the ink-jet ink does not contain a volatile organic compound (VOC), and the ink-jet ink is curable by irradiation with an active energy ray.

2. The method for preserving an ink-jet ink of claim 1, wherein the cationic polymerizable monomer is an oxetane compound.

3. The method for preserving an ink-jet ink of claim 2, wherein the cationic polymerizable monomer is a compound comprising an oxirane group in the molecule.

4. A method for forming an image, comprising the steps of:
- jetting a droplet of an ink-jet ink of claim 2 from an ink-jet head onto a recording material; and
- irradiating the recording medium jetted the ink-jet ink with an active energy ray,
- wherein the irradiating step is carried out between 0.001 and 2.0 seconds after the jetted droplet of the ink-jet ink reaches on the recording material.

5. The method for preserving an ink-jet ink of claim 1, wherein the cationic polymerizable monomer is a compound comprising an oxirane group in the molecule.

6. A method for forming an image, comprising the steps of:
- jetting a droplet of an ink-jet ink of claim 5 from an ink-jet head onto a recording material; and
- irradiating the recording medium jetted the ink-jet ink with an active energy ray,
- wherein the irradiating step is carried out between 0.001 and 2.0 seconds after the jetted droplet of the ink-jet ink reaches on the recording material.

7. A method for forming an image, comprising the steps of:
- jetting a droplet of an ink-jet ink of claim 1 from an ink-jet head onto a recording material; and
- irradiating the recording medium jetted the ink-jet ink with an active energy ray,
- wherein the irradiating step is carried out between 0.001 and 2.0 seconds after the jetted droplet of the ink-jet ink reaches on the recording material.

8. A method for forming an image of claim 7, wherein a total thickness of the ink on the recording material after the irradiating step is 2 to 20 $\mu$m.

9. A method for forming an image of claim 7, wherein an amount of the droplet of the ink-jet ink-jetted from an ink-jet head is 2 to 15 pl.

10. A method for forming an image of claim 7, wherein in the jetting step, a temperature of the ink-jet ink and the ink-jet head are controlled within 35 to 100° C.

11. A method for forming an image of claim 7, wherein the jetted ink droplet on the recording material is heated after the irradiating step.

12. A method for forming an image of claim 7, wherein the recording material is a non-absorbable recording material.

13. A method for forming an image of claim 12, wherein the non-absorbable recording material has a surface energy of 3.5 to $6.0 \times 10^{-2}$ Nm$^{-1}$.

* * * * *